United States Patent [19]

Loizeau

[11] Patent Number: 4,537,579
[45] Date of Patent: Aug. 27, 1985

[54] TORSIONAL DAMPER DEVICE

[75] Inventor: Pierre Loizeau, Ville d'Avray, France

[73] Assignee: Valeo, Paris, France

[21] Appl. No.: 530,042

[22] Filed: Sep. 7, 1983

[30] Foreign Application Priority Data

Sep. 7, 1982 [FR] France .................... 82 15176

[51] Int. Cl.³ .................... F16D 3/14; F16D 13/68
[52] U.S. Cl. .................... 464/68; 192/106.2; 464/64; 464/66; 464/85
[58] Field of Search .................... 464/62–68, 464/81, 82, 85, 903; 192/106.1, 106.2

[56] References Cited

U.S. PATENT DOCUMENTS

| 2,437,537 | 3/1948 | Kelleher | 464/68 |
| 2,533,789 | 12/1950 | Goodchild | 464/85 |
| 2,613,785 | 10/1952 | Mohns | 464/68 X |
| 3,948,373 | 4/1976 | Worner | 464/68 X |
| 4,101,015 | 7/1978 | Radke | 192/106.2 |
| 4,398,625 | 8/1983 | Beccaris | 192/106.2 |
| 4,410,075 | 10/1983 | Caray et al. | 464/68 X |
| 4,440,283 | 4/1984 | Nioloux | 192/106.2 |
| 4,461,376 | 7/1984 | Lech, Jr. et al. | 464/68 X |

FOREIGN PATENT DOCUMENTS

| 1120897 | 12/1961 | Fed. Rep. of Germany . |
| 740783 | 2/1933 | France . |
| 2346599 | 10/1977 | France . |
| 2493446 | 1/1983 | France . |

Primary Examiner—John Petrakes
Attorney, Agent, or Firm—Charles A. Brown; Charles E. Brown

[57] ABSTRACT

A torsional damper device suitable for friction clutches, especially those for automotive vehicles, comprises two parts disposed to rotate relative to one another within defined limits of relative angular movement. Such relative angular movement is resisted by elastic members each of which is disposed in a housing formed by holes in said parts. Associated with at least one of the elastic members is a respective bearing member disposed in the axial direction between at least one circumferential end of the elastic member and one of the coaxial parts. The bearing member has, perpendicular to the axis of the assembly, at least one arm through the intermediary of which it bears axially on the coaxial part concerned.

15 Claims, 12 Drawing Figures

TORSIONAL DAMPER DEVICE

BACKGROUND OF THE INVENTION

1. Field of the Invention

The present invention is generally concerned with torsional damper devices comprising at least two coaxial parts disposed to rotate relative to one another within defined limits of relative angular movement against elastic means hereinafter referred to as circumferentially acting elastic means.

2. Description of the Prior Art

This type of torsional damper is normally incorporated in the design of a friction clutch, particularly for automotive vehicles, in which case one coaxial part carries a friction disk designed to roatate with a first shaft, in practice a driving shaft and the motor output shaft in the case of an automotive vehicle, whereas another of said coaxial parts is carried on a hub designed to rotate with a second shaft, in practice a driven shaft, and the gearbox input shaft in the case of an automotive vehicle.

This type of torsional damper is used to permit regulated transmission of rotational torque applied to one of its coaxial parts where another is itself subject to a rotational torque. It is thereby able to filter vibrations which may arise at any point in the kinematic system in which it is incorporated, extending from the motor to the driven road wheels in the case of an automotive vehicle.

In practice, friction means are deployed between the coaxial parts of the damper device concerned to provide the necessary damping.

More often than not, such friction means comprise friction rings disposed axially between said coaxial parts.

The present invention is particularly directed towards the case where one, and in practice all, of the coaxial parts of the torsional damper device concerned comprises at least one transversely disposed annular flange, commonly referred to as a hub flange, or guide ring in which are formed holes adapted to house elastic members which form part of the associated circumferentially acting elastic means.

More often than not, the elastic members bear directly in the circumferential direction on the corresponding radial edge of the holes in which they are disposed, these holes in at least some of said flanges having more or less extensive members along at least one of their circumferential edges adapted to retain elastic members of this kind.

It has already been proposed, in particular in French Pat. No. 740 783, in which one of the coaxial parts of the torsional damper device concerned comprises a hub flange and the other comprises two guide rings disposed one on each side of said hub flange and the guide rings utilized have no member for retaining the elastic means, to dispose in the circumferential direction between each of the elastic members and the edges of the holes in the guide rings in which the elastic member is disposed a member constituting a chock, hereinafter referred to for convenience as a bearing member, adapted to retain the elastic member.

A general object of the present invention is to draw additional benefit from a bearing member of this kind, whether utilized to retain the corresponding elastic member or for any other purpose.

SUMMARY OF THE INVENTION

More precisely, the present invention consists in a torsional damper device comprising at least two coaxial parts disposed to rotate relative to one another within defined limits of relative angular movement, a transversely disposed flange on one side of said parts, two transversely disposed guide rings on the other of said parts attached to and spaced from one another and disposed one on each side of said flange, circumferentially acting elastic means disposed between and adapted to act circumferentially on said parts so as to resist said relative angular movement and comprising at least one elastic member and, associated therewith, a respective bearing member disposed, in the circumferential direction, between said elastic member and one of said coaxial parts, and respective holes in said flange and said guide rings together forming housings in which respective elastic members are disposed, wherein each of said bearing members has transversely disposed, perpendicular to the axis of the assembly, two arms through the intermediary of which it bears axially on respective guide rings.

By virtue of these arms, the bearing member contributes to the generation of the friction necessary to the required damping action.

In practice, the corresponding friction is with advantage developed only when the corresponding elastic member is itself operative.

In other words, in accordance with the invention, as soon as an elastic member of this kind is effectively operative between the two coaxial parts between which it is circumferentially disposed, there is developed a specific friction effect which, where necessary, is combined with the effect of other friction means, if any, also utilized.

Moreover, in the case where a respective bearing member is associated with each circumferential end of the same elastic member, said bearing members being operative individually according to the direction of relative angular movement between the two coaxial parts concerned, it is readily and advantageously possible, in accordance with the invention, and if required, to make the specific friction effects associated with an elastic member of this kind for the two circumferential directions of relative angular movement, respectively corresponding to the operation of the torsional damper device concerned with increasing torque and with decreasing torque, different.

It is only necessary to adjust the friction conditions associated with one or both arms of the corresponding bearing member.

Further objects and advantages will appear from the following description of examples of the invention, when considered in connection with the accompanying drawings, and the novel features will be particularly pointed out in the appended claims.

BRIEF DESCRIPTION OF THE DRAWINGS

FIG. 3 is a partial circumferential cross-section through it on the line III—III in FIG. 1, in the rest configuration of the assembly.

FIG. 4 is a view in elevation of one of the bearing members utilized in this torsional damper device, shown in isolation.

FIG. 5 is a plan view of this bearing member, seen in the direction of the arrow V in FIG. 4.

FIGS. 6 and 7 are views analogous to those of FIGS. 4 and 5 of another form of bearing member utilized in the torsional damper device in accordance with the invention.

FIG. 9 is a view analogous to that of FIG. 3, corresponding to the final phase of this operation.

DESCRIPTION OF THE PREFERRED EMBODIMENTS

Figure 1:
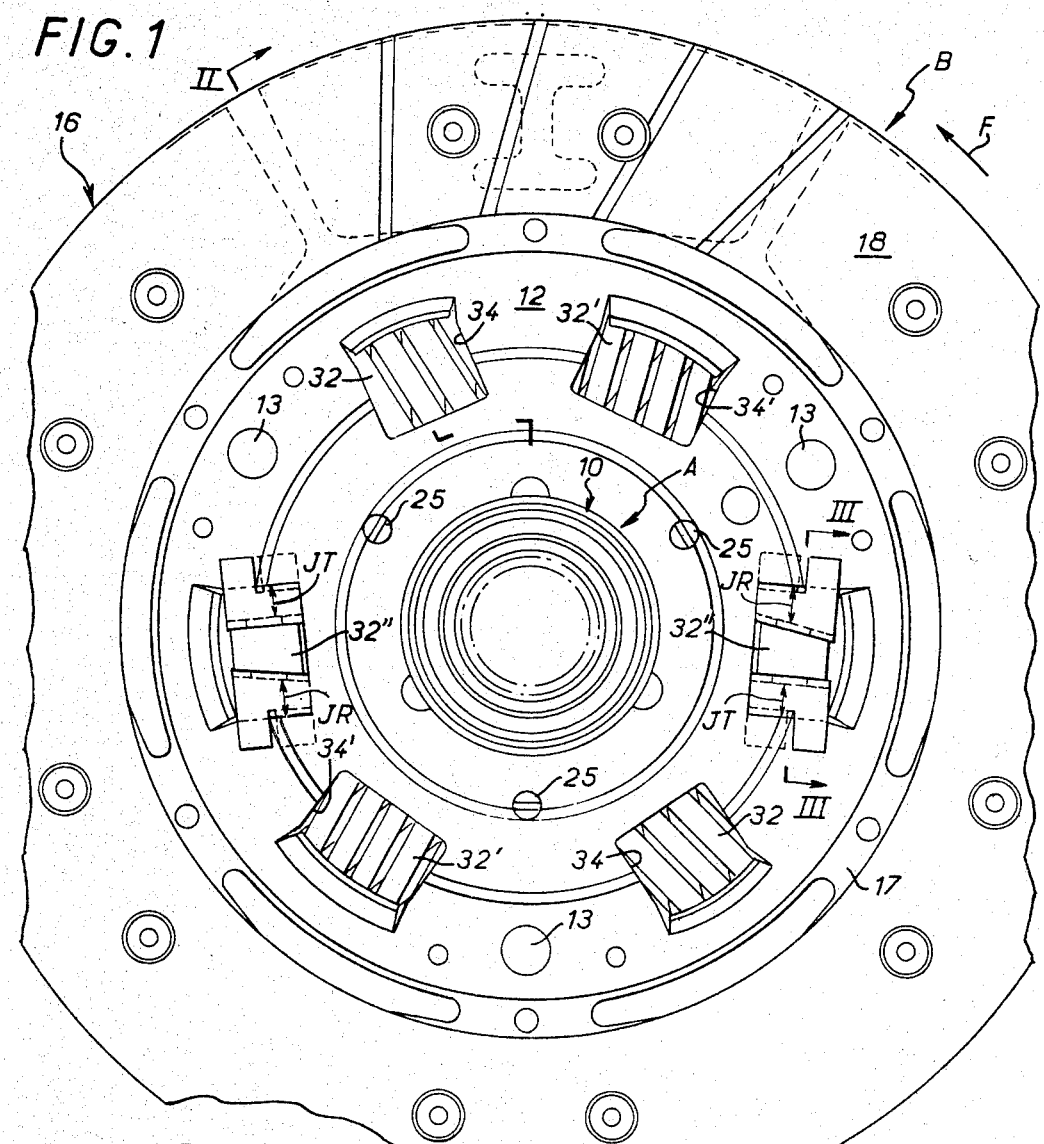
FIG. 1 is a partial view in elevation of a torsional damper device in accordance with the invention.

As shown in these figures, which illustrate, by way of example, the application of the invention to the construction of a friction clutch with damper-type hub for automotive vehicles, the torsional damper device in accordance with the invention generally comprises at least two coaxial parts A and B disposed to rotate relative to one another, as will be described in detail hereinafter, within defined limits of relative angular movement, against the action of the elastic means adapted to act circumferentially between them, hererinafter referred to for convenience as circumferentially acting elastic means.

In the embodiments shown there are only the two coaxial parts A and B.

In these embodiments the coaxial part A comprises an internally splined hub 10 designed to be keyed to, so as to rotate with, a shaft, in practice a driven shaft, the gearbox input shaft in the case of an automotive vehicle, and a transversely disposed annular hub flange 11 which is keyed to rotate with hub 10 and which, for example and as shown, is attached to the latter by crimping.

Conjointly, the coaxial part B comprises at least one transversely disposed guide ring 12. In the embodiments shown it comprises two transverse guide rings 12 attached to one another by axial spacers 13 which pass with clearance through notches 14 formed for this purpose in the edge of the hub flange 11, the guide rings being disposed one on each side of and spaced from said hub flange 11.

Since the assembly constitutes a friction clutch for an automotive vehicle, the coaxial part B further comprises a friction disk 16 with a flange 17 coupled to one of guide rings 12, on the side thereof towards hub flange 11, and which, by virtue of friction facings 18 attached to each side of the perimeter of flange 17, is designed to be clamped between two plates keyed to, so as to rotate with, a shaft, in practice a driving shaft, the motor output shaft in the case of an automotive vehicle.

In practice, in the embodiments shown, flange 17 of friction disk 16 is attached to guide ring 12 to which it is coupled by pegs 13 which also attach to the latter the other guide ring 12, the flange being of unitary construction. As an alternative, flange 17 may be subdivided into vanes.

In the following description, it will be considered as equivalent to guide ring 12 to which it is coupled.

Figure 2:
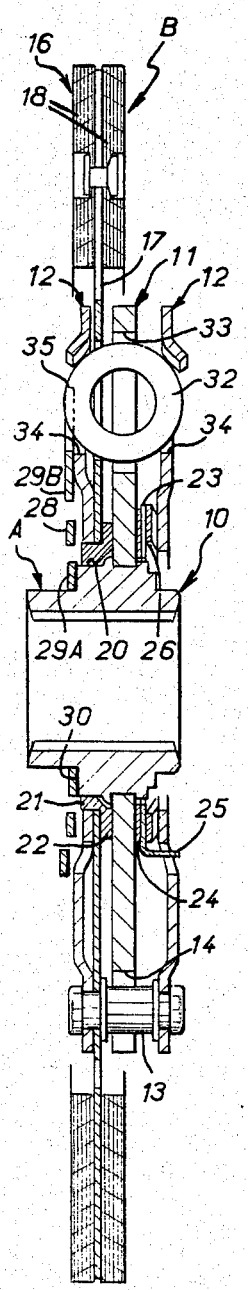
FIG. 2 is an axial cross-section through it on the line II—II in FIG. 1.

Between the inner perimeter of that of guide rings 12 to which is coupled friction disk 16 and its flange 17 and a bearing surface 20 of hub 10 there extends annularly a bearing 21 to which is attached a radial flange 22 inserted axially between said flange 17 of friction disk 16 and hub flange 11 (FIG. 2).

On the other side of hub flange 11, between the latter and the corresponding guide ring 12, there further extends a support ring 23 which carries, in contact with said hub flange 11, a friction facing 24. Keyed to said guide ring 12 so as to rotate therewith by axial lugs 25, it is acted on by an axially acting elastic ring 26, for example a corrugated ring of the kind available under the trade name "ONDULFLEX", bearing on said guide ring 12.

These arrangements are well known per se and as they do not form part of the present invention will not be described in detail here.

In a manner also known per se, the circumferentially acting elastic means disposed between coaxial parts A and B are divided, in the embodiments shown in the figures, to form two damper stages of differing stiffness, a first damper stage of relatively lower stiffness, which acts alone at the start of relative angular movement between said coaxial parts A and B, and a second damper stage of relatively higher stiffness which acts in conjunction with the first from a particular value of such relative angular movement.

In the embodiments shown and as described in detail in the aforementioned French Patent Application No. 80 23447 filed Nov. 3, 1980 and published under the number 2 493 446, the first damper stage comprises one or more elastically deformable arms 28 circumferentially established between, on the one hand, a support member 29A which rotates with coaxial part A, being to this end, for example, attached to hub 10 against a transverse shoulder 30 thereof, and, on the other hand, a support member 29B which rotates with coaxial part B, by virtue of arrangements to be described in more detail hereinafter (FIG. 2).

The second damper stage provided between coaxial parts A and B comprises elastic members of which is disposed in a housing formed partly by a hole formed for this purpose in hub flange 11 and partly by holes formed for this purpose in guide rings 12.

In the embodiments shown and in a manner known per se, these elastic members are themselves divided into a number of separate groups, intervention of which during relative angular movement between coaxial parts A and B is modulated as a function of the degree of such movement.

There is firstly a first group of elastic members formed by two coil springs 32 in substantially diametrically opposite positions relative to one another and extending substantially tangentially relative to a circumference of the assembly. Each is disposed in a housing formed partly by a hole 33 in hub flange 11 and partly in holes 34 in guide rings 12, the circumferential amplitude of said hole 33 in hub flange 11 being greater than that of said holes 34 in guide rings 12.

It is in practice through the intermediary of these springs 32, which are the first to act in the second damper stage, that support member 29B for the elastically deformable arm(s) 28 of the first damper stage is constrained to rotate with coaxial part B, said support member 29B having projecting radially from its periphery at least one pair of arms 35 by virtue of which it is engaged over at least one of springs 32 (FIG. 2), without clearance, for example, although it will be understood that the various alternative arrangements, as described inter alia in the aforementioned French Patent Application No. 80 23447, are equally applicable.

In the embodiments shown, the second group of elastic members of the second damper stage similarly comprises two springs 32′, each disposed in a housing formed partly by a hole in hub flange 11 (not visible in the figures) and partly by holes 34′ in guide rings 12, the circumferential amplitude of said hole in hub flange 11 being greater than that of said holes 34′ in guide rings 12 by a clearance value which is greater in both circumferential directions than the corresponding clearance existing between springs 32 and hole 33 in hub flange 11 and holes 34 in guide rings 12.

In the embodiments shown, the third group of elastic members of the second damper stage comprises two blocks 32″ of elastic material, such as an elastomer, for example, like springs 32 and 32′ disposed, alternately with said springs, in respective housings formed partly by a hole 33″ in hub flange 11 and partly by holes 34″ in guide rings 12.

Although in the rest configuration of the assembly, springs 32 and 32′ bear directly in the circumferential direction and at their corresponding ends on the radial edges of holes 34, 34′ of guide rings 12 in which they are disposed, each elastic material block 32″ bears circumferentially on the radial edges of holes 34″ in guide rings 12 through the intermediary of intermediate members, hereinafter referred to for convenience as bearing members, disposed in the circumferential direction between at least one, and in practice each, circumferential end thereof and coaxial part B; these bearing members respectively comprising a bearing member 36T for those of these circumferential ends which are on the trailing side in the circumferential direction indicated by an arrow F in FIG. 1, and corresponding to forward movement of the automotive vehicle concerned, and a bearing member 36R for those of these circumferential ends which are on the leading side in the aforementioned circumferential direction.

In accordance with arrangements which do not constitute part of the present invention and so will not be described in detail herein, opposite hub flange 11 at least one of bearing members 36T, 36R, and in practice both of the latter in the embodiment shown in FIGS. 1 to 9, has a recess 38 such that, on relative angular movement between coaxial parts A and B, and as will emerge hereinafter, hub flange 11 may become displaced in the circumferential direction beyond the point of contact of a bearing member 36T, 36R of this kind on the associated edge of holes 34′ in guide rings 12.

In accordance with the invention, each of bearing members 36T, 36R has at least one arm 39 disposed transversely, that is to say perpendicular to the axis of the assembly. Through at least part of this arm it bears axially on the coaxial part concerned, that is to say coaxial part B comprising guide rings 12 when it is between this coaxial part B and the corresponding block 32″ of elastic material that a bearing member 36T, 36R of this kind is circumferentially disposed.

In the embodiments shown, each bearing member 36T, 36R extends integrally from one of guide rings 12 to the other and is stirrup-shaped.

It therefore has two transverse arms 39, through the intermediary of which it bears axially on the respective guide rings 12.

In practice, it is also through the intermediary of its arms 39 that the stirrup member thus constituting a bearing member 36T, 36R bears on the corresponding edge of windows 34″ in guide rings 12 while offering, through the intermediary of its median part 40, a circumferential bearing surface to the block 32″ of elastic material concerned, at the corresponding circumferential end thereof.

In the embodiment shown in FIGS. 1 to 9, each arm 39 of the stirrup member of this kind has a lug 42 which is axially offset relative to the main part of the arm 39, and forms with this main part a yoke 43 by virtue of which said arm 39 is engaged on the corresponding edge of hole 34″ in the guide ring 12 concerned (FIGS. 3 to 7), and the bottom 44 of which is adapted to bear in the circumferential direction against said edge, and does so in the rest configuration of the assembly, as shown in FIG. 3.

The yokes 43 which each bearing member 36T, 36R thus has constitute retaining means adapted to retain a bearing member 36T, 36R of this kind parallel to the axis of the assembly, and it is by virtue of its concavity that the stirrup member constituting a bearing member of this kind forms the recess 38 which a bearing member of this kind has.

In the embodiment shown in FIGS. 1 to 9, the main part of each arm 39 of the stirrup member constituting a bearing member 36T, 36R is in contact with the outside surface of the guide ring 12 concerned, being disposed outside the volume delimited in the axial direction between guide rings 12. On the other hand, the corresponding lug 42 is in contact with the internal surface of said guide ring 12, within this volume.

It will be appreciated that the opposite arrangement is also possible as an alternative, if desired.

Be this as it may, all that is necessary is for the stirrup member constituting a bearing member 36T, 36R to bear axially on the corresponding guide ring 12, through all or part of at least one of its arms 39, without necessarily gripping the ring in the axial direction.

However, if required, the yoke 43 formed by these arms may, in the rest configuration, have an axial offset which is less than the thickness of a guide ring 12, so as to clamp the latter when engaged thereon and thereby associate an axial clamping action with the corresponding axial bearing contact; in other words, each of the parts concerned of at least one of these arms may, if required, be elastically urged towards the coaxial part B on which it bears in the axial direction.

In the embodiment shown in FIGS. 1 to 9, and for reasons to be explained hereinafter, the circumferential amplitude L of a hole 33″ in hub flange 11 in which there is housed a block 32″ of elastic material is equal to that of holes 34″ in guide rings 12 in which there is also housed a block 32″ of elastic material. In the rest configuration of the assembly, the radial edges of these holes 33″ and 34″ are lined up with one another.

By virtue of the recess provided in accordance with the invention in each bearing member 36T, 36R there is, in the rest configuration of the assembly, circumferential clearance between the corresponding radial edge of each hole 33″ in hub flange 11 and median part 40 of bearing member 36T, 36R, of value JT in the case of bearing member 36T and JR in the case of bearing member 36R (FIGS. 1 and 3).

Each of these circumferential clearances JT, JR is proportional to the circumferential amplitude of recess 38 in the corresponding bearing member 36T, 36R.

In practice, they may be the same or different.

In the embodiment shown in FIGS. 1 to 9, the circumferential amplitude of recess 38 of bearing member 36T is less than that of recess 38 of bearing member 36R, so that circumferential clearance JT is less than circumferential clearance JR.

In practice, and as will emerge hereinafter, in the embodiment shown in FIGS. 1 to 9 circumferential clearance JR is sufficient for blocks 32" of elastic material to have no effect in the corresponding circumferential direction.

Because of this, in this embodiment median part 40 of corresponding bearing member 36R is substantially at right angles to the edges of its arms 39.

On the other hand, median part 40 of bearing member 36T is slanting so that it is generally oblique relative to a radius of the assembly passing through its central area, in order to allow for relative angular movement between coaxial parts A and B.

Moreover, in the embodiment shown in FIGS. 1 to 9, median part 40 of each bearing member 36T, 36R has, in its central area, an opening 45 through which projects a peg 46 of elastic material integral with the block 32" of elastic material concerned.

In this embodiment, the primary function of the pegs 46 thus provided on a block 32" of elastic material of this kind is to maintain the block 32" of elastic material parallel to the axis of the assembly.

As will emerge hereinafter, that associated with bearing member 36T has the further function of damping impact between the corresponding radial edge of hole 33" in hub flange 11 and median part 40 of bearing member 36T on relative angular movement between coaxial parts A and B.

In operation with the direction of rotation as shown by the arrow F in FIG. 1 and the torque increasing, when torque is applied to coaxial part B, during a first phase of operation only elastically deformable arm(s) 28 of the first damper stage give elastically, doing so immediately.

Figure 8:
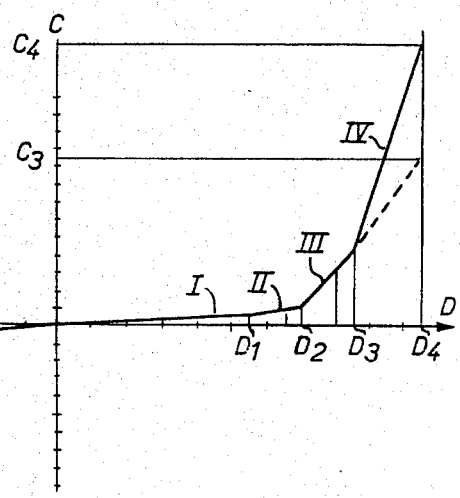
FIG. 8 is a diagram illustrating the operation of the torsional damper device in accordance with the invention.

In the diagram in FIG. 8, the abscissae represent the relative angular displacement D between the coaxial part B and the coaxial part A and the ordinates represent the torque C transmitted from one of these parts to the other. In this diagram, this first phase of operation is represented by a straight line I the slope of which is proportional to the stiffness of elastically deformable arm(s) 28.

This first phase of operation continues until, for a value D1 of the relative angular displacement D, the corresponding radial edge of holes 33 in hub flange 11 in which are housed springs 32 of the second damper stage come into contact with the corresponding ends of springs 32.

The latter then come into play, their effect being combined with that of elastically deformable arm(s) 28. In the diagram in FIG. 8, this second phase of operation is represented by a straight line II the slope of which is proportional to the combined stiffness.

Similarly, for a value D2 of the relative angular displacement D, these springs 32' in turn begin to act, at which time there begins a third phase of operation represented in the diagram in FIG. 8 by a straight line III the slope of which is proportional to the combined stiffness.

Finally, for a value D4 of the relative angular displacement D, the circumferential clearance JT associated with the blocks 32" of elastic material is in turn absorbed (FIG. 9) such that, after a preliminary damping effect due to the crushing of their corresponding pegs 46, these blocks 32" of elastic material in turn come into effect.

The fourth phase of operation which then begins is represented on the diagram in FIG. 8 by a straight line IV the slope of which is proportional to the combined stiffness of the elastic members acting at this time. It continues until, for a value D4 of the relative angular displacement D, coaxial part A is driven directly by coaxial part B, either because the turns of at least some of springs 32, 32' are then contiguous or because the pegs 13 are then in contact with the corresponding edge of the notches 14 in the hub disk 11 through which they pass.

The torque then transmitted from coaxial part B to coaxial part A has a value C4 corresponding to the ordinate of the point on the straight line IV of which the abscissa is D4.

It is significantly greater than the torque C3 which would be transmitted in the absence of the blocks 32" of elastic material, this being given by the ordinate of the point on the dashed extension of straight line III with the abscissa D4.

For operation of the assembly with decreasing torque, the torque between the coaxial parts B and A is reversed and a process similar to that previously described occurs.

However, in the embodiment shown in FIGS. 1 to 9, and allowing for the value selected to this end for circumferential clearance JR, the blocks 32" of elastic material do not have any effect so that only the first three phases of operation described hereinabove occur.

This is not necessarily the case, however, since the blocks 32" of elastic material could be effective with decreasing torque just as they are with increasing torque.

In this case, the median part 40 of the bearing member concerned is oblique, to allow for relative angular movement between coaxial parts A and B, and clearance JR is modified accordingly.

It will be understood that in foregoing description, and for reasons of simplification, no account has been taken of the well-known phenomenon of hysteresis which, due to friction between the coaxial parts A and B, results in a difference between the value of the torque transmitted between the coaxial parts A and B with increasing relative angular displacement and that of the torque transmitted between these coaxial parts with decreasing relative angular displacement.

In accordance with the invention, each bearing member 36T, 36R contributes to this hysteresis effect at all times that the blocks 32" of elastic material are operative.

In the case of operation of the torsional damper device concerned with increasing torque, for example, when the blocks 32" of elastic material come into action, after their corresponding peg 46 is crushed, the median part 40 of their corresponding bearing member 36T bears in the circumferential direction against hub flange 11 forming part of coaxial part A so that, as each block 32" of elastic material becomes compressed in the circumferential direction, there occurs displacement in the circumferential direction between the arms 39 of bearing member 36T and the guide rings 12 forming part of coaxial part B.

As these arms bears axially on these guide rings 12, through their main part and through the lug 42 formed therefrom, there results from their relative circumferential displacement a friction torque the effects of which are added to those already operative.

In FIG. 9, the relative circumferential displacement between the arms 39 of the bearing member 36T and the guide rings 12 is materialized by the circumferential clearance J which the appears, because of such relative circumferential displacement, between, on the one hand, the the corresponding edge of the holes 34" in the guide rings 12 and, on the other hand, the base 44 of the yokes 43 which these arms 39 form.

Naturally enough, the same process occurs in the case of bearing member 36R on operation of the torsional damper device concerned with decreasing torque.

Figure 10:
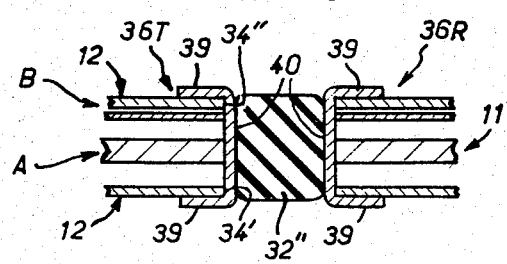
FIGS. 10 to 12 are views analogous to that of FIG. 3 relating to respective alternative embodiments, and to a larger scale.

In the embodiment shown in FIG. 10, there is no circumferential clearance between the hub flange 11 and the bearing member 36T, 36R associated with the blocks 32" of elastic material when the assembly is in the rest configuration, as a result of which these blocks come into effect as soon as relative angular movement between the coaxial parts A and B begins.

Conjointly, in this embodiment and in the rest configuration of the assembly, the stirrup members constituting the bearing members 36T, 36R bear directly, through their median part 40, against the corresponding edge of the holes 34" in the guide rings 12 so that no yoke is required on their arms 39 for retaining them.

Finally, in this embodiment, the elastically deformable blocks 32" do not have any peg projecting towards the hub flange 11 through the corresponding bearing members 36T, 36R.

However, as previously, as soon as these blocks 32" of elastic material come into action, there occurs between the arms 39 of the corresponding bearing member 36T, 36R on the one hand and the guide rings 12 on the other hand a relative circumferential displacement which generates a friction torque.

Figure 11:
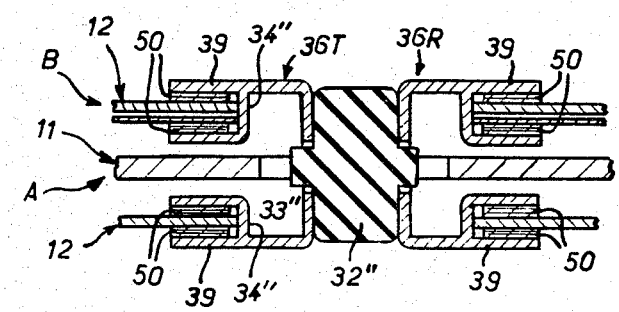

In the embodiment shown in FIG. 11 which is, overall, analogous to that shown in FIG. 3, a friction facing 50 is axially disposed between at least one of arms 39 of at least one of bearing members 36T, 36R on the one hand and the corresponding guide ring 12 on the other hand.

In the embodiment shown, a friction facing 50 of this kind is provided for both bearing members 36T and 36R and on one or the other surface of the guide rings 12, in view of the yoke-like configuration which each of the arms 39 of these bearing members then has.

The friction facings thus associated with a bearing member 36T may naturally be of different nature to that of the friction facings associated with a bearing member 36R, and so have different coefficients of friction, to make different the corresponding friction torques for operation of the torsional damper device concerned with increasing torque on the one hand and operation with decreasing torque on the other hand.

Figure 12:
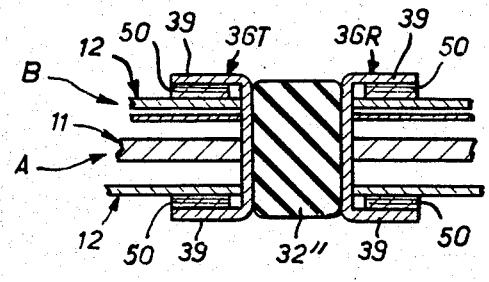

In the embodiment shown in FIG. 12, which corresponds overall to that shown in FIG. 10, a friction facing 50 is also provided between each arm 39 of each of bearing members 36T and 36R on the one hand and the corresponding guide ring 12 on the other hand.

It will be understood that various changes in the details, materials and arrangements of parts, which have been herein described and illustrated in order to explain the nature of the invention, may be made by those skilled in the art within the principle and scope of the invention as expressed in the appended claims.

For example, the circumferential amplitude of the holes 33" in the hub flange 11 in which are housed the blocks 32" of elastic material is not necessarily equal to that of the corresponding holes 34" in the guide rings 12.

This is the case, for example, in the embodiment shown in FIG. 9, in which the corresponding circumferential amplitudes are not the same.

The application of the invention is not limited to the case where the torsional damper comprises only two coaxial parts disposed to rotate relative to one another, extending also to the case where a torsional damper device of this kind comprises a large number of coaxial parts disposed to rotate in pairs.

What I claim is:

1. A torsional damper device in particular for a clutch plate comprising at least two coaxial parts mounted to rotate relative to each other within defined limits of relative angular movement, a transversely extending flange on one of said coaxial parts, two transversely extending guide rings on the other of said coaxial parts, said guide rings being spaced from and attached to each other and disposed one on each side of said flange, circumferentially acting elastic means disposed between and adapted to act circumferentially on said coaxial parts so as to resist said relative angular movement, apertures in said guide rings and flange for housing said elastic means, said elastic means comprising at least one elastic member, a bearing member circumferentially and operatively disposed between said elastic member and said guide rings, said bearing member having two transverse arms extending perpendicularly to the axis of said device and circumferentially overlying the respective guide rings, said arms being axially spaced from and out of contact with said flange, constant frictional contact being provided between said arms and the respective guide rings, whereby frictional torque is produced between said arms and guide rings in the course of relative angular movement therebetween.

2. A torsional damper according to claim 1, wherein each of said arms of said bearing member forms a yoke, each of said yokes being engaged on an edge portion of a corresponding hole defined by the corresponding guide ring.

3. A torsional damper device according to claim 1, wherein a friction facing is disposed axially between each of said arms of said bearing member and the corresponding guide ring.

4. A torsional damper device according to claim 3, wherein at least a portion of said arm is elastically biased axially toward the corresponding guide ring.

5. A torsional damper device according to claim 1, wherein at least a portion of said arm is elastically biased axially toward the corresponding guide ring.

6. A torsional damper device according to claim 1, wherein a circumferential end of said elastic member bears against said bearing member.

7. A torsional damper device according to claim 1, wherein one of said bearing members is disposed at each circumferential end of said elastic member.

8. A torsional damper device according to claim 1, wherein one of said bearing members is disposed at each circumferential end of said elastic member, a friction facing is disposed axially between each of said arms of each said bearing members and the respective guide rings, said friction facings having different coefficients of friction.

9. A torsional damper device according to claim 1, wherein one of said arms of said bearing member forms a yoke, said one arm thus engaging the edge portion of a hole defined by the corresponding guide ring.

10. A torsional damper device according to claim 1, wherein said elastic member comprises a block of elastic material.

11. A torsional damper device according to claim 1, wherein said arms effectively bear axially against the axially outer surfaces of the respective guide rings.

12. A torsional damper device according to claim 1, wherein said arms effectively bear axially against the axially outer and inner surfaces of the respective guide rings.

13. A torsional damper device according to claim 1, wherein said arms bear directly axially against the axially outer surfaces of the respective guide rings.

14. A torsional damper device according to claim 1, wherein said arms bear axially against the axially outer surfaces of the respective guide rings through friction facings.

15. A torsional damper device according to claim 1, wherein said arms extend transversely from an axially extending portion of said bearing member.

* * * * *